Patented May 30, 1933

1,912,123

UNITED STATES PATENT OFFICE

CHRISTOPH BECK, OF LUDWIGSHAFEN-ON-THE-RHINE, HEINRICH DIEKMANN, OF MANNHEIM, AND FRANZ KREMP, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF FATTY ACIDS

No Drawing. Application filed April 1, 1931, Serial No. 527,050, and in Germany April 8, 1930.

The present invention relates to the production of fatty acids.

It has already been proposed to obtain oxidation products having a high content of fatty acids, by the destructive oxidation of hydrocarbon mixtures, such as paraffin wax or mineral oil by means of oxygen compounds of nitrogen, such as nitric acid, nitric oxides or gases containing these substances. When the oxidation products are subjected to further treatment for the purpose of obtaining soaps, emulsifying agents and the like, for example by distillation, saponification or bleaching, considerable difficulties arise, such as frothing during distillation, incomplete separation of the fatty acids from the oxidation mixture and the like, and, moreover, the products obtained from such fatty acid mixtures often have a distinctly unpleasant odour.

We have now found that all these difficulties can be readily overcome and that high grade fatty acids are obtained by decomposing and/or removing the inorganic and organic nitrogenous products by treating the oxidation products containing the nitrogen compounds besides large quantities of fatty acids with agents furnishing with water a high ion concentration i. e. with alkaline or acid agents having with water a degree of dissociation above that of ammonia.

The process according to the present invention can, for example, be carried out by treating the oxidation products with agents having an alkaline reaction, in the presence of water, while heating up to temperatures between about 150° and 250° C., and removing the ammonia, amines or other nitrogen compounds liberated. The heating may be carried out indirectly or by blowing through a heated gas or vapor, such as nitrogen, carbon dioxide or superheated steam. Since the reaction is usually carried out in a closed vessel pressure is originated therein and the volatile nitrogen compounds formed can be mainly blown off during or after the process by partly or completely releasing the pressure. The strong alkaline agents may be chosen from caustic soda or potash or preferably from soda which is cheaper; caustic alkaline earth compounds, such as caustic lime, may be also employed provided they possess an alkalinity above that of ammonia. If soda or caustic alkali be employed the temperature of working may be somewhat below 150° C., say 148° C. but higher temperatures within the aforesaid range are preferred for accelerating the reaction. It is of particular advantage for the conversion of the nitrogen which is originally present in the form of NO-, $NO_2$- groups, to work with a quantity of alkali or alkaline earth exceeding that corresponding to the saponification value of the oxidation products at increased temperatures, such for example as 150° C. in a closed autoclave. The temperature of working may be also increased above 250°, say to 300° C., but in this case special pressure-tight apparatus is necessary, temperatures between 170° and 220° C. being preferred. The nitrogen compounds, for the most part readily volatile, can be recovered by condensation or absorption and those which are less volatile are dissolved by the acid employed for the purification or for liberating the fatty acids from the soaps, if alkali has been employed. After acidifying the product treated with alkali, for example with mineral acids, the fatty acids can be easily isolated and are now practically free from nitrogen and have no odour. If it be intended to make soaps or emulsifying agents, then it is of advantage to proceed in such a way that the oxidation product which still contains nitrogen and is rich in fatty acids, is saponified with an excess of alkali calculated on the saponification value and, after the nitrogenous compounds have been blown out, to produce directly the desired composition of grain, toilet or similar soap by adding odourless vegetable, animal or synthetic fatty acids from the oxidation of hydrocarbons in proportion to the excess of alkali to the saponified oxidation product, after which the soap composition can be finally worked according to the methods used in the soap industry.

It is also possible to remove the troublesome nitrogen compounds by treating the raw oxidation products with acid or with agents having an acid reaction. It is, for example, possible to treat the oxidation product with dilute aqueous mineral acids, such as from 5 to 50 per cent aqueous sulphuric, hydrochloric or phosphoric acids, preferably at the temperatures referred to above and at elevated pressure originating by working in closed vessels. The quantity of acid is generally chosen in a ratio of at least 1 molecular proportion per each molecular proportion of nitrogen present in the raw oxidation products. The nitrogenous compounds are thereby converted into water-soluble substances and the aqueous solution can then be easily separated from the fatty acids forming a supernatant layer. The elimination of the nitrogen compounds can also be carried out with advantage immediately after bleaching the nitrogenous fatty acids with chlorine in the presence of water or with aqueous hypochlorous acid, whereby the hydrochloric acid which is formed during the process of bleaching is used for dissolving out the nitrogen compounds.

The following examples will further illustrate the nature of this invention, but the invention is not restricted to these examples.

Example 1

Hard paraffin wax is oxidized by treating it with nitric oxide gases, or with a 50 per cent nitric acid, for example according to the specification of the U. S. application Ser. No. 376,838 filed July 8, 1929 of two of the present applicants. The oxidation product which has thus been obtained and which has a nitrogen content of 2½ per cent and the acid number of which is 200, is mixed with a 20 per cent aqueous caustic soda solution whereby an excess of caustic soda solution (calculated on the saponification number) is used. The alkaline mixture is heated in an autoclave for a period of about three hours to a temperature of from 150° to 180° C. The nitrogen compounds which separate during this treatment are expelled from the alkaline solution by means of nitrogen or like inert gas, the treatment with nitrogen being continued until the escaping vapors no longer change red litmus paper into blue. The alkaline soap solution is then diluted with water and separated from the non-oxidized paraffin wax which may have separated out, after which the fatty acids are precipitated by acidifying with aqueous hydrochloric acid. By this treatment the nitrogen which was originally present in the raw product is removed to within 0.2 per cent. The purified fatty acids can then be worked into soap and the like, without difficulty.

Example 2

100 parts of an oxidation product obtained as described in the foregoing example and having a nitrogen content of 3.5 per cent, are heated together with 100 parts of 6-n-sulphuric acid, for 2 hours in an autoclave to a temperature of 170° C. while shaking. After the sulphuric acid has separated the fatty acid is washed with water. After this treatment the fatty acid which is free from sulphuric acid, contains only 0.4 per cent of nitrogen, which causes no trouble during further working. Instead of the sulphuric acid 6-n-phosphoric or 2-n-hydrochloric acids may be employed.

What we claim is:

1. The process for removing organic nitrogen compounds from fatty acids, prepared by the destructive oxidation of hydrocarbon mixtures by means of oxygen compounds of nitrogen, which comprises heating the said crude fatty acids to temperatures above 150° C. in the presence of an aqueous solution of a hydrolyzing agent having in water a degree of dissociation above that of ammonia and selected from the group consisting of caustic soda, caustic potash, caustic lime and sulphuric, hydrochloric and phosphoric acids.

2. The process for removing organic nitrogen compounds from fatty acids, prepared by the destructive oxidation of hydrocarbon mixtures by means of nitric acid, which comprises heating the said crude fatty acids to temperatures between about 150° and about 300° C. in the presence of an aqueous solution of a hydrolyzing agent having in water a degree of dissociation above that of ammonia and selected from the group consisting of caustic soda, caustic potash, caustic lime and sulphuric, hydrochloric and phosphoric acids.

3. The process for removing organic nitrogen compounds from fatty acids, prepared by the destructive oxidation of hydrocarbon mixtures by means of oxygen compounds of nitrogen, which comprises heating the said crude fatty acids to temperatures between about 150° and about 250° C. in the presence of an aqueous solution of an alkaline hydrolyzing agent having in water a degree of dissociation above that of ammonia and selected from the group consisting of caustic soda, caustic potash and caustic lime.

4. The process for removing organic nitrogen compounds from fatty acids, prepared by the destructive oxidation of hydrocarbon mixtures by means of nitric acid, which comprises heating the said crude fatty acids to temperatures between about 150° and about 300° C. in the presence of an aqueous solution of an acid hydrolyzing agent having in water a degree of dissociation above that of ammonia and selected from the group consisting of sulphuric, hydrochloric and phosphoric acids.

In testimony whereof we have hereunto set our hands.

CHRISTOPH BECK.
HEINRICH DIEKMANN.
FRANZ KREMP.